(12) United States Patent
Rakouki

(10) Patent No.: US 10,696,277 B1
(45) Date of Patent: Jun. 30, 2020

(54) LENS CLEANING SYSTEM FOR A VEHICULAR BACKUP CAMERA

(71) Applicant: Motaz Jamal Rakouki, Cypress, TX (US)

(72) Inventor: Motaz Jamal Rakouki, Cypress, TX (US)

( * ) Notice: Subject to any disclaimer, the term of this patent is extended or adjusted under 35 U.S.C. 154(b) by 322 days.

(21) Appl. No.: 15/783,867

(22) Filed: Oct. 13, 2017

Related U.S. Application Data

(60) Provisional application No. 62/409,157, filed on Oct. 17, 2016.

(51) Int. Cl.
| | | |
|---|---|---|
| *B62M 25/04* | (2006.01) | |
| *B60S 1/54* | (2006.01) | |
| *G02B 7/02* | (2006.01) | |
| *G02B 27/00* | (2006.01) | |
| *B60S 1/56* | (2006.01) | |

(52) U.S. Cl.
CPC . *B60S 1/54* (2013.01); *B60S 1/56* (2013.01); *G02B 7/028* (2013.01); *G02B 27/0006* (2013.01)

(58) Field of Classification Search
CPC .... B60S 1/54; B60S 1/56; B60S 1/566; B60S 1/0862; B60S 1/52; G02B 7/028; B08B 3/02; B08B 3/10; B08B 5/02; H04N 5/2171
See application file for complete search history.

(56) References Cited

U.S. PATENT DOCUMENTS

2016/0272164 A1\* 9/2016 Hsiao .................... B60S 1/0862

OTHER PUBLICATIONS

Dan Mihalascu, Nissan Debuts Intelligent Self-Cleaning Rear View Camera on New Note, Carscoops, Oct. 23, 2013, pp. 1-4, available at http://www.carscoops.com/2013/06/nissan-debuts-intelligent-self-cleaning.html.

\* cited by examiner

*Primary Examiner* — Shawntina T Fuqua
(74) *Attorney, Agent, or Firm* — Plager Schack LLP; Mark H. Plager; Eric Liou

(57) ABSTRACT

A lens cleaning system to remove water droplets, ice, dirt or debris from a backup camera mounted to a vehicle is provided. The cleaning system includes a heating subsystem and air generating subsystem coupled to the vehicle to clean the camera's lens. The heating subsystem includes a tray coupled to the backup camera, a heating element disposed on the tray and positioned proximate the lens of the backup camera, the heating element operably connected to a battery by a first wiring, and a first momentary switch electrically coupled to the first wiring and designed to enable or disable the heating element. The first momentary switch is depressed to enable the heating element to generate heat in the area surrounding the backup camera, thereby enabling the heating element to melt ice present on the lens of the backup camera.

8 Claims, 3 Drawing Sheets

LENS CLEANING SYSTEM FOR A VEHICULAR BACKUP CAMERA

RELATED APPLICATION

The application claims priority to provisional patent application U.S. Ser. No. 62/409,157 filed on Oct. 17, 2016, the entire contents of which is herein incorporated by reference.

BACKGROUND

The embodiments herein relate generally to cameras mounted on vehicles such as cars, trucks, buses, and the like. More specifically, embodiments of the invention relate to a lens cleaning system for use with a vehicle's rear-view or backup camera.

Vehicles such as cars often comprise one or more cameras mounted on the vehicle to provide the driver with a view of the surrounding area. This is particularly helpful when positioned at the vehicle's rear. A rear-view camera or backup camera helps the driver to locate the exact location of objects such as curbs, other cars, bystanders or other objects when backing up and/or parking. This greatly enhances safety by helping the driver to become aware of the vehicle's surroundings and avoid accidents.

During inclement weather such as rain or snow storms, water droplets, dirt, mud, snow or ice may accumulate on the lens of the vehicle's backup camera. This negatively affects the performance of the camera and distorts the generated image. In certain environments, ice can accumulate and completely block the lens, thereby rendering the backup camera useless. This deprives the driver from the benefit of the rear camera view when it is most needed.

To address this problem, Nissan has implemented a rear camera cleaning system that clears water droplets or dirt by use of a water and air blower system. However, this cleaning system is limited and not suitable for use in all environments because it does not effectively remove snow and ice from the rear camera's lens.

As such, there is a need in the industry for a lens cleaning system for use with a backup camera that addresses the limitations of the prior art, which effectively removes water droplets, dirt, mud, snow or ice from the backup camera's lens.

SUMMARY

A lens cleaning system configured to remove water droplets, ice, dirt or debris from a lens of a backup camera mounted to a vehicle is provided. The lens cleaning system is coupled to the vehicle and electrically coupled to a battery of the vehicle.

In certain embodiments, the cleaning system comprises a heating subsystem coupled to the vehicle and configured to melt ice present on the lens of the backup camera. The heating subsystem comprises a tray coupled to the backup camera, a heating element disposed on the tray and positioned proximate the lens of the backup camera, the heating element operably connected to the battery by a first wiring, and a first momentary switch electrically coupled to the first wiring and configured to adjust to a first position to enable the heating element or a second position to disable the heating element, wherein the first momentary switch in the first position enables the heating element to generate heat in the area surrounding the backup camera, thereby enabling the heating element to melt ice present on the lens of the backup camera.

In certain embodiments, the cleaning system comprises an air generating subsystem coupled to the vehicle and configured to direct generated airflow on the lens of the backup camera to remove water droplets, ice, dirt or debris present thereon. The air generating subsystem comprises an air compressor coupled to the vehicle and operably connected to the battery by a second wiring, a nozzle coupled to an outlet of the air compressor and facing the lens of the backup camera, a second momentary switch electrically coupled to the second wiring and configured to adjust to a first position to enable the air compressor or a second position to disable the air compressor, wherein the second momentary switch in the first position enables the air compressor to generate the airflow that flows out the outlet of the air compressor to permit the air nozzle to dispense generated air on the lens of the backup camera.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
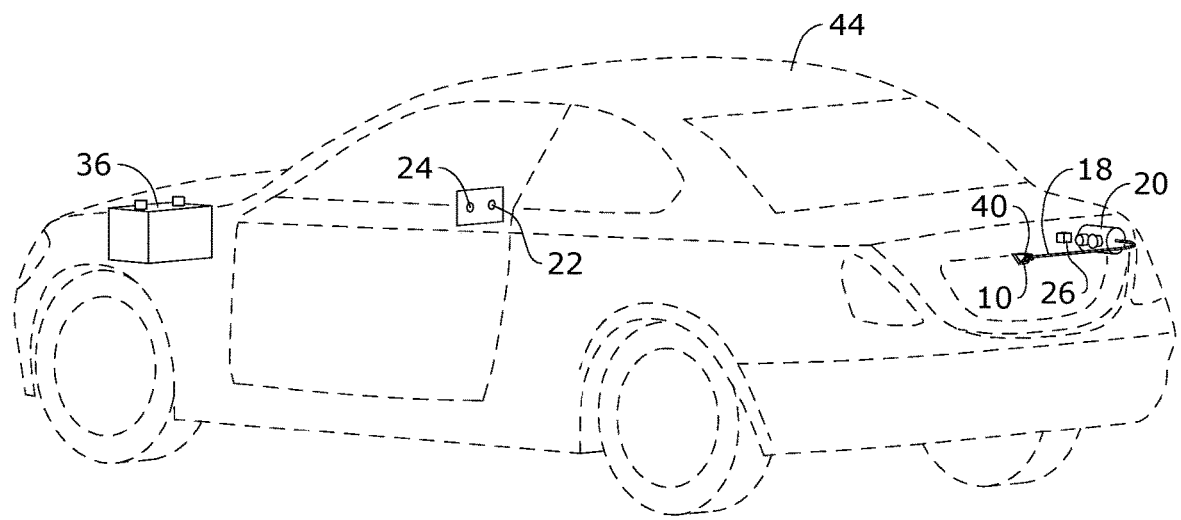
FIG. 1 depicts a perspective view of certain embodiments of the cleaning system.
Figure 2:
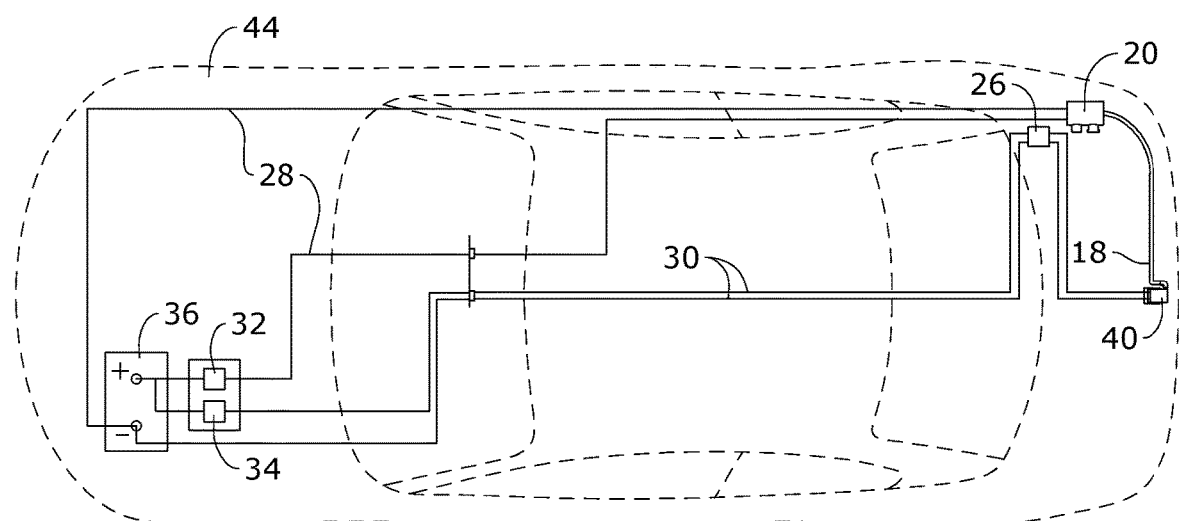
FIG. 2 depicts a top schematic view of certain embodiments of the cleaning system.

As depicted in FIGS. 1-5, the lens cleaning system is coupled to vehicle 44 and configured to remove obstructions including, but not limited to, water droplets, dirt, mud, snow or ice that accumulates on the lens of a camera mounted to vehicle 44. In one embodiment, the lens cleaning system comprises heating subsystem 50 and air generating subsystem 52 both operably connected to backup camera 40 and powered by battery 36 of vehicle 44. It shall be appreciated that vehicle 44 may be any type of vehicle including, but not limited to, cars, trucks, buses, trailers, boats, planes, and the like.

In certain embodiments, heating subsystem 50 is configured to melt snow and/or ice that accumulates on the lens of backup camera 40. Heating subsystem 50 generally comprises tray 10, heating element 14, heater momentary push button 24, timer relay 26, and first fuse 34.

Figure 3:
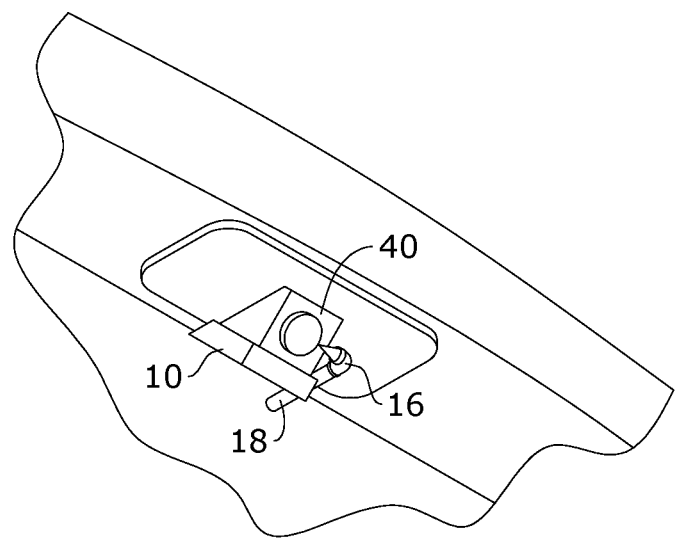
FIG. 3 depicts a bottom perspective view of certain embodiments of the cleaning system.
Figure 4:
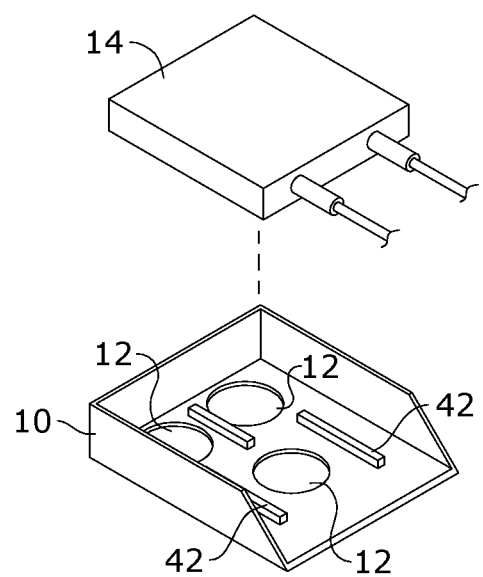
FIG. 4 depicts an exploded view of certain embodiments of the cleaning system.
Figure 5:
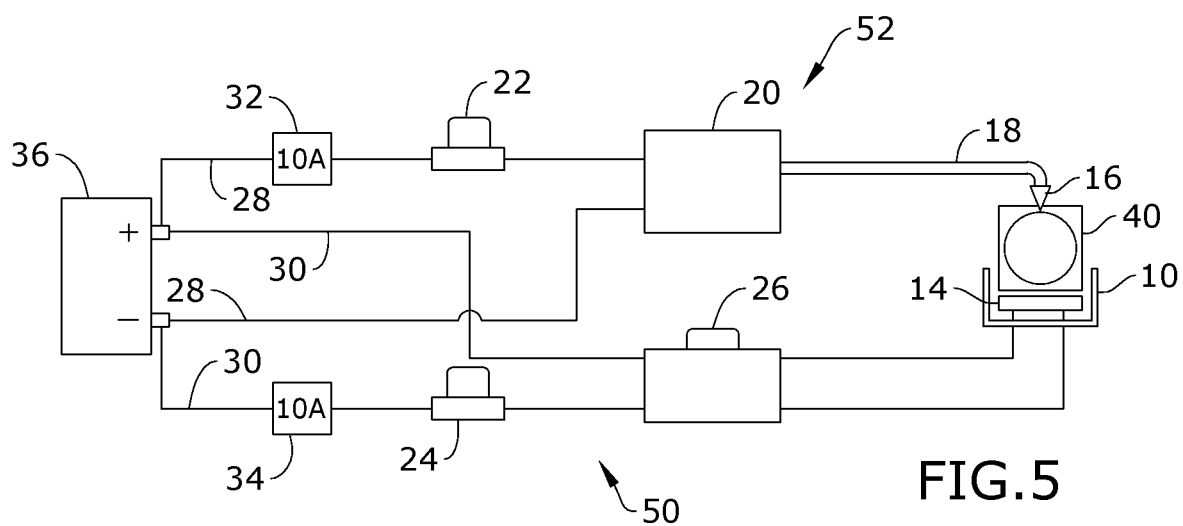
FIG. 5 depicts a schematic view of certain embodiments of the cleaning system illustrating wiring of the heating subsystem and air generating subsystem.
Figure 6:
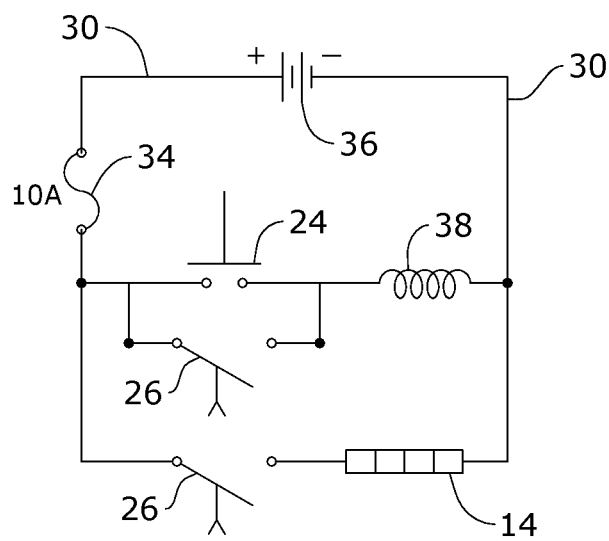
FIG. 6 depicts a schematic view of certain embodiments of the cleaning system illustrating wiring of the heating subsystem.
Figure 7:
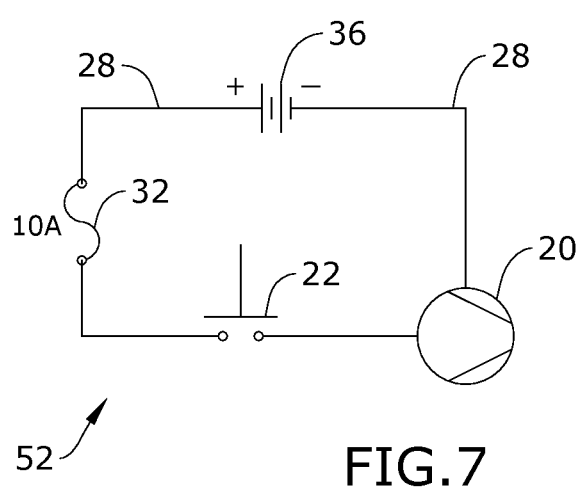
FIG. 7 depicts a schematic view of certain embodiments of the cleaning system illustrating wiring of the air generating subsystem.

As depicted in FIGS. 3-4, tray 10 is configured to receive heating element 14, which is electrically coupled to battery 36 of vehicle 44 by heater wiring 30. In one embodiment, heating element 14 is coupled to tray 10 by mechanical fasteners (not shown) and/or an adhesive. Tray 10 is coupled to backup camera 40 by fastening components such as mechanical fasteners (not shown) and/or an adhesive. This assembly permits heating element 14 to be secured beneath the lens of backup camera 40. In a preferred embodiment, heating element 14 is a 50 W aluminum PTC heater with a constant operating temperature of approximately 140 degrees Fahrenheit. In one embodiment, heating element 14 comprises approximate dimensions of 1"×⅞"×3/16". However, alternative types of heaters with variable specifications may be useful in the lens cleaning system.

Tray 10 comprises a bottom face and a plurality of side walls coupled together and extending along the perimeter of the bottom face. Tray 10 is preferably made from a heat retardant material such as fiberglass or an alternative generally non-conductive material. In one embodiment, tray 10 comprises approximate dimensions of 1⅛"×1"×¼". In certain embodiments, the bottom face of tray 10 comprises a plurality of elongated support bars 42 coupled thereto and a plurality of drainage holes 12. Elongated support bars 42 elevate heating element 14 above the bottom face of tray 10 so that water droplets, dirt and melted ice can pass through drainage holes 12 and drip out of tray 10. In one embodiment, each drainage hole 12 comprises an approximate diameter of ¼". However, the size of drainage holes 12 may vary.

As depicted in FIGS. 1-2 and 5-6, first fuse 34, heater momentary push button 24, timer relay 26 and timing relay coil 38 are electrically coupled to both battery 36 and heating element 14 by heater wiring 30. First fuse 34 is located in a fuse box of vehicle 44 and is configured to protect the circuit of heating subsystem 50 from overcurrent or any possible short circuit.

Heater momentary push button 24 is preferably located in the cabin of vehicle 44 on the dashboard to be readily accessible to the driver. Heater momentary push button 24 serves as a switch that enables heating element 14 to operate after the button is depressed. More specifically, the depression of heater momentary push button 24 causes timer relay 26 to latch and close the circuit for a predetermined time period such as 15-20 seconds. During this time, heating element 14 is enabled to generate heat that melts snow and/or ice accumulation on the lens of backup camera 40. After the predetermined time period concludes, timer relay 26 times out and opens the circuit to disable heating element 14 automatically. As such, timer relay 26 serves as a safety mechanism to disable heating element 14 to prevent overheating and continued operation when no longer necessary. If additional time is required to melt snow and/or ice on the lens of backup camera 40, heater momentary push button 24 can be depressed as many times as needed.

In one embodiment, timer relay 26 is located at the rear of vehicle 44 such as in the trunk. In one embodiment, timer relay 26 comprises an adjustable knob to vary the predetermined time of closed circuit operation of heating subsystem 50 within the approximate range of 0-60 seconds.

In certain embodiments, air generating subsystem 52 of the lens cleaning system is configured to remove dirt or water droplets from rain, melted snow or other sources from the lens of backup camera 40. Air generating subsystem 52 generally comprises air nozzle 16, air hose 18, air compressor 20, air momentary push button 22 and second fuse 32.

As depicted in FIGS. 1-2, 5 and 7, second fuse 32, air momentary push button 22 and air compressor 20 are electrically coupled to battery 36 by compressor wiring 28. Second fuse 32 is located in a fuse box of vehicle 44 and is configured to protect the circuit of air generating subsystem 52 from overcurrent or any possible short circuit.

Air compressor 20, air hose 18 and air nozzle 16 are connected together and secured to the rear of vehicle 44 so that generated air is directed toward the lens of backup camera 40. In one embodiment, rubber vibration absorbing material can be disposed around air compressor 20 to insulate and/or absorb any generated vibrations. Air compressor 20 is preferably a 12 VDC air compressor with a maximum operating output pressure within the approximate range of 120 to 300 psi. In one embodiment, air compressor 20 comprises approximate dimensions of 6"×4"×2". Air hose 18 is coupled to an outlet of air compressor 20 and is a flex hose that comprises approximately a ⅜" diameter and a length up to 6'. Air nozzle 16 is coupled to the end of air hose 18 and oriented to face the lens of backup camera 40. In a preferred embodiment, the opening of air nozzle 16 is positioned approximately ½" or less away from the lens of backup camera 40.

Air momentary push button 22 is preferably located in the cabin of vehicle 44 on the dashboard to be readily accessible to the driver. Air momentary push button 22 serves as a switch that enables air compressor 20 to operate after the button is depressed. Air compressor 20 is enabled to generate air so long as air momentary push button 22 is depressed. The circuit is opened and air compressor 20 is disabled when air momentary push button 22 is released.

In operation, the lens cleaning system permits the driver of vehicle 44 to conveniently remove any combination of water droplets, dirt, mud, snow, ice or debris accumulated on the lens of backup camera 40. Depending on the items obstructing the lens of backup camera 40, the driver can activate heating subsystem 50 or air generating subsystem 52 by depressing the corresponding momentary push buttons 22, 24 as needed.

Although embodiments of the invention describe the lens cleaning system for use with a backup camera mounted to the vehicle's rear, it shall be appreciated that the lens cleaning system may be installed and used with any camera mounted to the vehicle's top, side, front or other location. In alternative embodiments, the lens cleaning system can be used with other monitoring, traffic or security camera lenses on buildings, highways, other vehicles, and the like.

It shall be appreciated that the components of the lens cleaning system described in several embodiments herein may comprise any alternative known materials in the field and be of any color, size and/or dimensions. It shall be appreciated that the components of the lens cleaning system described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A lens cleaning system configured to remove water droplets, ice, dirt or debris from a lens of a backup camera mounted to a vehicle, the lens cleaning system coupled to the vehicle and electrically coupled to a battery of the vehicle, the cleaning system comprising:
    a heating subsystem coupled to the vehicle and configured to melt ice present on the lens of the backup camera, the heating subsystem comprising:

a tray coupled to the backup camera, the tray comprising a bottom face and a plurality of side walls coupled thereto, the plurality of side walls extending along a perimeter of the bottom face, the bottom face comprising a plurality of drainage holes;

a heating element disposed on the tray and positioned proximate the lens of the backup camera, the heating element operably connected to the battery by a first wiring; and a first momentary switch electrically coupled to the first wiring and configured to adjust to a first position to enable the heating element or a second position to disable the heating element;

wherein the first momentary switch in the first position enables the heating element to generate heat in the area surrounding the backup camera, thereby enabling the heating element to melt ice present on the lens of the backup camera; and an air generating subsystem coupled to the vehicle and configured to direct generated airflow on the lens of the backup camera to remove water droplets, ice, dirt or debris present thereon, the air generating subsystem comprising:

an air compressor coupled to the vehicle and operably connected to the battery by a second wiring;

a nozzle coupled to an outlet of the air compressor and facing the lens of the backup camera; and a second momentary switch electrically coupled to the second wiring and configured to adjust to a first position to enable the air compressor or a second position to disable the air compressor;

wherein the second momentary switch in the first position enables the air compressor to generate the airflow that flows out the outlet of the air compressor to permit the air nozzle to dispense generated air on the lens of the backup camera.

2. The lens cleaning system of claim 1, further comprising a plurality of support bars coupled to the bottom face of the tray to elevate the heating element above the plurality of drainage holes.

3. The lens cleaning system of claim 2, wherein the heating element of the heating subsystem comprises a timer relay electrically coupled to the first wiring.

4. The lens cleaning system of claim 3, wherein the heating subsystem comprises a first fuse electrically coupled to the first wiring and the air generating subsystem comprises a second fuse electrically coupled to the second wiring.

5. The lens cleaning system of claim 4, further comprising an air hose connecting the outlet of the air compressor to the air nozzle.

6. The lens cleaning system of claim 5, wherein the heating element of the heating subsystem comprises a PTC heater that operates at a constant temperature of approximately 140 degrees Fahrenheit.

7. The lens cleaning system of claim 6, wherein the air compressor of the air generating subsystem comprises a maximum operating output pressure within the approximate range of 120 to 300 psi.

8. The lens cleaning system of claim 7, wherein each fuse in the first and second fuses is a 10 Amp fuse.

\* \* \* \* \*